US012259820B2

United States Patent
Srinivasan

(10) Patent No.: US 12,259,820 B2
(45) Date of Patent: *Mar. 25, 2025

(54) PROCESSOR-BASED SYSTEM FOR ALLOCATING CACHE LINES TO A HIGHER-LEVEL CACHE MEMORY

(71) Applicant: QUALCOMM Incorporated, San Diego, CA (US)

(72) Inventor: Ramkumar Srinivasan, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/624,301

(22) Filed: Apr. 2, 2024

(65) Prior Publication Data

US 2024/0248851 A1 Jul. 25, 2024

Related U.S. Application Data

(63) Continuation of application No. 18/169,852, filed on Feb. 15, 2023, now Pat. No. 12,093,184.

(Continued)

(51) Int. Cl.
*G06F 12/08* (2016.01)
*G06F 12/0891* (2016.01)
(Continued)

(52) U.S. Cl.
CPC ...... *G06F 12/0897* (2013.01); *G06F 12/0891* (2013.01); *G06F 12/126* (2013.01)

(58) Field of Classification Search
CPC .... G06F 12/12; G06F 12/126; G06F 12/0897; G06F 12/08; G06F 12/0891
See application file for complete search history.

(56) References Cited

U.S. PATENT DOCUMENTS 8,782,348 B2 7/2014 Eddy et al.
9,606,935 B2 3/2017 Rao et al.
(Continued)

FOREIGN PATENT DOCUMENTS

| GB | 2540761 A | * | 2/2017 | ......... G06F 12/0811 |
| WO | WO-2007096572 A1 | * | 8/2007 | ......... G06F 12/0862 |
| WO | WO-2020190796 A1 | * | 9/2020 | ......... G06F 12/0875 |

OTHER PUBLICATIONS

J. Gaur, A. R. Alameldeen and S. Subramoney, "Base-Victim Compression: An Opportunistic Cache Compression Architecture," 2016 ACM/IEEE 43rd Annual International Symposium on Computer Architecture (ISCA), Seoul, Korea (South), 2016, pp. 317-328.*

(Continued)

*Primary Examiner* — Pierre Michel Bataille
(74) *Attorney, Agent, or Firm* — QUALCOMM Incorporated

(57) ABSTRACT

A processor-based system for allocating a higher-level cache line in a higher-level cache memory in response to an eviction request of a lower-level cache line is disclosed. The processor-based system determines whether the cache line is opportunistic, sets an opportunistic indicator to indicate that the lower-level cache line is opportunistic, and communicates the lower-level cache line and the opportunistic indicator. The processor-based system determines, based on the opportunistic indicator of the lower-level cache line, whether a higher-level cache line of a plurality of higher-level cache lines in the higher-level cache memory has less or equal importance than the lower-level cache line. In response, the processor-based system replaces the higher-level cache line in the higher-level cache memory with the lower-level cache line and associates the opportunistic indi- (Continued)

cator with the lower-level cache line in the higher-level cache memory.

20 Claims, 10 Drawing Sheets

Related U.S. Application Data

(60) Provisional application No. 63/387,519, filed on Dec. 15, 2022.

(51) Int. Cl.
  *G06F 12/0897* (2016.01)
  *G06F 12/126* (2016.01)

(56) References Cited

U.S. PATENT DOCUMENTS

| | | | |
|---|---|---|---|
| 10,223,278 | B2 | 3/2019 | Priyadarshi et al. |
| 10,671,539 | B2 | 6/2020 | Thompto et al. |
| 10,754,784 | B1* | 8/2020 | Jakkula ............... G06F 9/5016 |
| 2007/0067578 | A1* | 3/2007 | Kurichiyath ........ G06F 12/0897 |
| | | | 711/E12.043 |
| 2009/0094418 | A1 | 4/2009 | Warner et al. |
| 2010/0235576 | A1 | 9/2010 | Guthrie et al. |
| 2010/0312970 | A1* | 12/2010 | Bell ..................... G06F 12/121 |
| | | | 711/146 |
| 2011/0161589 | A1 | 6/2011 | Guthrie et al. |
| 2014/0168244 | A1 | 6/2014 | Akenine-Moller et al. |
| 2014/0189240 | A1 | 7/2014 | Keppel et al. |
| 2014/0281131 | A1* | 9/2014 | Joshi .................. G06F 12/0804 |
| | | | 711/133 |
| 2016/0182351 | A1 | 6/2016 | Wang et al. |
| 2016/0378651 | A1 | 12/2016 | Dulloor et al. |
| 2019/0155733 | A1* | 5/2019 | Hagersten ........... G06F 12/0895 |
| 2022/0350751 | A1 | 11/2022 | Koker et al. |
| 2024/0160570 | A1 | 5/2024 | Tkachuk et al. |
| 2024/0202131 | A1 | 6/2024 | Srinivasan |

OTHER PUBLICATIONS

E. Speight, H. Shafi, Lixin Zhang and R. Rajamony, "Adaptive mechanisms and policies for managing cache hierarchies in chip multiprocessors," 32nd International Symposium on Computer Architecture (ISCA'05), Madison, WI, USA, 2005, pp. 346-356.*

Zhenlin Wang, K. S. McKinley, A. L. Rosenberg and C. C. Weems, "Using the compiler to improve cache replacement decisions," Proceedings. International Conference on Parallel Architectures and Compilation Techniques, Charlottesville, VA, USA, 2002, pp. 199-208.*

T. Sondag and H. Rajan, "A More Precise Abstract Domain for Multi-level Caches for Tighter WCET Analysis," 2010 31st IEEE Real-Time Systems Symposium, San Diego, CA, USA, 2010, pp. 395-404.*

Gaur J., et al., "Base-Victim Compression: An Opportunistic Cache Compression Architecture", 2016 ACM/IEEE 43rd Annual International Symposium on Computer Architecture (ISCA), Seoul, Korea (South), 2016, pp. 317-328.

Ghosh M., et al., "Virtual Exclusion: An Architectural Approach to Reducing Leakage Energy in Caches for Multiprocessor Systems", 2007 International Conference on Parallel and Distributed Systems, Hsinchu, Taiwan, 2007, 8 Pages.

International Search Report and Written Opinion for International Patent Application No. PCT/US2023/081158, mailed Mar. 14, 2024, 13 pages.

* cited by examiner

PROCESSOR-BASED SYSTEM FOR ALLOCATING CACHE LINES TO A HIGHER-LEVEL CACHE MEMORY

PRIORITY APPLICATIONS

The present application is a continuation of and claims priority to U.S. patent application Ser. No. 18/169,852, filed Feb. 15, 2023 and entitled "PROCESSOR-BASED SYSTEM FOR ALLOCATING CACHE LINES TO A HIGHER-LEVEL CACHE MEMORY," which is incorporated herein by reference in its entirety.

U.S. patent application Ser. No. 18/169,852 claims priority to U.S. Provisional Patent Application No. 63/387,519, filed Dec. 15, 2022 and entitled "PROCESSOR-BASED SYSTEM FOR ALLOCATING CACHE LINES TO A HIGHER-LEVEL CACHE MEMORY," which is incorporated herein by reference in its entirety.

BACKGROUND

I. Field of the Disclosure

The field of the disclosure relates to a cache memory in a processor-based system (e.g., a graphics processing unit (GPU)-based system, a central processing unit (CPU)-based system), and more particularly to methods of improving cache hit rate in a higher-level cache memory.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory. For example, this memory can be a cache memory local to the PU, a shared local cache among PUs in a PU block, a shared cache among multiple PU blocks, and/or a system memory in a processor-based system. Cache memory, which can also be referred to as just "cache," is a smaller, faster memory that stores copies of data stored at frequently accessed memory addresses in a main memory or higher-level cache memory to reduce memory access latency. Thus, a cache memory can be used by a PU to reduce memory access times.

When data requested by a memory read request is present in a cache memory (i.e., a cache "hit"), system performance may be improved by retrieving the data from the cache instead of slower access system memory. Conversely, if the requested data is not found in the cache (resulting in a cache "miss"), the requested data then must be read from a higher-level cache memory or a system memory. Frequent occurrences of cache misses result in system performance degradation that could negate the advantage of using the cache in the first place. The cache hit rate of cache memory can generally be improved by increasing the size of a cache memory because an increased size cache memory can store more cache lines, thus increasing the likelihood of a cache hit. However, increasing the size of cache memory comes at an increased cost in terms of increased area and power consumption.

Returning to the situation when requested data is read from a higher-level cache memory or a system memory on a cache miss, the requested data is typically stored in cache memory local to a PU for later use. Often writing the requested data to the local cache will cause an existing cache line from the local cache to be evicted. The evicted cache line may need to be written to a higher-level cache memory to be subsequently shared among other PUs. As such, higher-level cache memory is typically larger than lower-level cache memory and may contain many unallocated or invalid cache lines. Whether to write or allocate the evicted line to a higher-level cache memory can influence the cache hit rate of the higher-level cache memory and the performance of the PUs sharing the higher-level cache memory.

SUMMARY

Aspects disclosed in the detailed description include a processor-based system for allocating a cache line to a higher-level cache memory in response to an eviction request of a lower-level cache line. Related processor-based apparatus and methods are also disclosed. In exemplary aspects, a cache allocation circuit is provided as part of a processor-based system. The processor-based system may include a processing unit (PU), such as a central processing unit (CPU) and/or a dedicated PU, such as a graphic processing unit (GPU), as examples. The processor-based system also includes a multi-level cache system and system memory. Because lower-level cache memory is closer to a PU than higher-level cache memory, data retrieved from lower-level cache memory is faster than retrieval from higher-level cache memory. The highest level of cache memory is the last level of cache memory before accessing data from system memory. System memory contains the full physical address space for memory, while each level of the multi-level cache system does not. Since higher-level cache memory is shared by multiple PUs when a cache line is evicted from a lower-level cache memory, it may or may not be written to a higher-level cache memory. Heuristics or filters are applied to determine whether the evicted cache line is known to be useful (i.e., more likely to accessed again in cache memory before being evicted to system memory) and, if it is not, the cache line is opportunistic (i.e., less likely to be accessed again in cache memory before being evicted to system memory. Opportunistic cache lines have less importance than useful cache lines. However, some conventional cache allocation systems are designed to not allocate evicted cache lines that are not useful to a next higher-level cache. If a higher-level cache line in higher-level cache memory for which the lower-level cache line may be written has less or equal importance than the lower-level cache line, the lower-level cache line will replace the data at that location in order to better utilize the higher-level cache memory with more important cache lines. As an example, an unallocated invalid cache line in the higher-level cache memory would get replaced with an opportunistic lower-level cache line. If, however, the higher-level cache line has more importance than the lower-level cache line, the lower-level cache line will not overwrite that higher-level location in order to not pollute the higher-level cache memory with less important data.

In this regard, in exemplary aspects disclosed herein, when a lower-level cache line is evicted in a processor-based system, the processor-based system will determine whether the cache line is opportunistic. The processor-based system will set an opportunistic indicator to indicate that the lower-level cache line is opportunistic and communicate the lower-level cache line and the opportunistic indicator to a higher-level cache memory (e.g., a next higher-level cache memory). The processor-based system determines, based on the opportunistic indicator of the lower-level cache line, whether at least one higher-level cache line of a plurality of higher-level cache lines in the higher-level cache memory (e.g., a next higher-level cache memory) has less or equal importance than the lower-level cache line. In response to the determining a higher-level cache line in the higher-level cache memory has less or equal importance than the lower-level cache line, the processor-based system replaces the higher-level cache line in the higher-level cache memory with the lower-level cache line and associates the opportunistic indicator with the lower-level cache line in the higher-level cache memory. In this example, the higher-level cache memory is more highly utilized with more important cache lines.

However, in another example, if it is determined that a higher-level cache line in the higher-level cache memory has more importance than the evicted lower-level cache line, the evicted lower-level cache line is not written to the higher-level cache line. Instead, the higher-level cache memory is bypassed such that the evicted lower-level cache line is considered to replace a cache line in another next higher-level cache line or is written back to system memory. In this manner, if the evicted lower-level cache line has less importance than a next higher-level cache line, not writing such to a next higher-level cache memory may avoid polluting the next higher-level cache memory.

Note that in another example, if it is determined that a first higher-level cache line in a higher-level cache memory has more importance than the evicted lower-level cache line, and there is another, second higher-level cache memory between the first higher-level cache memory and system memory, the processor-based system can also perform the same function. In this regard, the processor-based system can again determine, based on the opportunistic indicator of the lower-level cache line, whether at least one higher-level cache line of a plurality of higher-level cache lines in the second higher-level cache memory has less or equal importance than the lower-level cache line. In response to the determining a higher-level cache line in the second higher-level cache memory has less or equal importance than the lower-level cache line, the processor-based system replaces the higher-level cache line in the second higher-level cache memory with the lower-level cache line and associates the opportunistic indicator with the lower-level cache line in the second higher-level cache memory. If it is determined that a higher-level cache line in the second higher-level cache memory has more importance than the evicted lower-level cache line, the evicted lower-level cache line is not written to the second higher-level cache line and can be considered to be written to either a next, third higher-level cache memory (if present), or is written to system memory.

In this regard, in one aspect, a processor-based system for allocating a cache line to a higher-level cache memory is disclosed. The processor-based system comprises a lower-level cache memory configured to store data. The processor-based system is configured to, in response to an eviction request of a lower-level cache line in the lower-level cache memory, determine whether the lower-level cache line is opportunistic, set an opportunistic indicator to indicate whether the lower-level cache line is opportunistic, communicate the lower-level cache line and the opportunistic indicator indicating that the lower-level cache line is opportunistic to the higher-level cache memory, and determine, based on the opportunistic indicator of the lower-level cache line, whether a higher-level cache line of a plurality of higher-level cache lines in the higher-level cache memory has less or equal importance than the lower-level cache line. In response to the determining the higher-level cache line has less or equal importance than the lower-level cache line, the processor-based system is configured to replace the higher-level cache line in the higher-level cache memory with the lower-level cache line and associate the opportunistic indicator of the lower-level cache line in the higher-level cache memory.

In another aspect, a method for allocating a cache line to a higher-level cache memory in response to an eviction request of a lower-level cache line in a lower-level cache memory is disclosed. The method comprises determining whether the lower-level cache line is opportunistic, setting an opportunistic indicator to indicate whether the lower-level cache line is opportunistic, communicating the lower-level cache line and the opportunistic indicator indicating that the lower-level cache line is opportunistic to the higher-level cache memory, and determining, based on the opportunistic indicator of the lower-level cache line, whether a higher-level cache line of a plurality of higher-level cache lines in the higher-level cache memory has less or equal importance than the lower-level cache line. The method also comprises, in response to the determining the higher-level cache line has less or equal importance than the lower-level cache line, replacing the higher-level cache line in the higher-level cache memory with the lower-level cache line and associating the opportunistic indicator of the lower-level cache line in the higher-level cache memory.

In another aspect, a processor-based system for allocating a cache line to a higher-level cache memory in response to an eviction request of a lower-level cache line in a lower-level cache memory is disclosed. The processor-based system comprises means for determining whether the lower-level cache line is opportunistic, means for setting an opportunistic indicator to indicate whether the lower-level cache line is opportunistic, means for communicating the lower-level cache line and the opportunistic indicator indicating that the lower-level cache line is opportunistic to the higher-level cache memory, and means for determining, based on the opportunistic indicator of the lower-level cache line, whether a higher-level cache line of a plurality of higher-level cache lines in the higher-level cache memory has less or equal importance than the lower-level cache line. The processor-based system also comprises, in response to the determining the higher-level cache line has less or equal importance than the lower-level cache line, means for replacing the higher-level cache line in the higher-level cache memory with the lower-level cache line, and means for associating the opportunistic indicator of the lower-level cache line in the higher-level cache memory.

DETAILED DESCRIPTION

Figure 1:
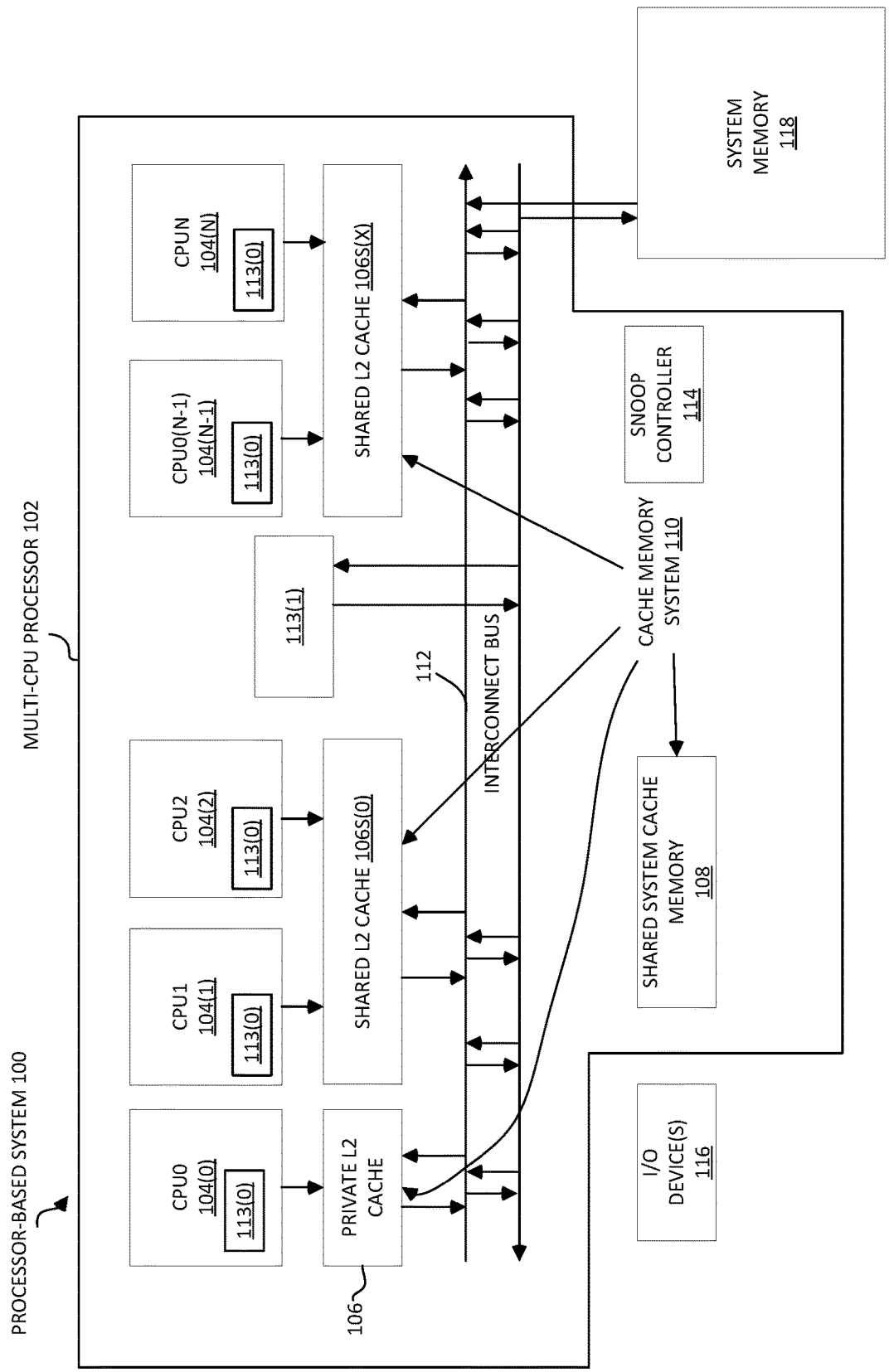
FIG. 1 is a block diagram of an exemplary processor-based system that includes multiple central processing units (CPUs) and a memory system that includes a cache memory system including a hierarchy of local and shared cache memories and a system memory, and wherein the processor-based system includes an exemplary cache allocation circuit configured to determine based on an opportunistic indicator associated with an evicted lower-level cache line whether a higher-level cache line in the higher-level cache memory has less or equal importance than the lower-level cache line in order to replace the higher-level cache line in the higher-level cache memory.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a processor-based system for allocating a cache line to a higher-level cache memory in response to an eviction request of a lower-level cache line. Related processor-based apparatus and methods are also disclosed. In exemplary aspects, a cache allocation circuit is provided as part of a processor-based system. The processor-based system may include a processing unit (PU), such as a central processing unit (CPU) and/or a dedicated PU, such as a graphic processing unit (GPU), as examples. The processor-based system also includes a multi-level cache system and system memory. Because lower-level cache memory is closer to a PU than higher-level cache memory, data retrieved from lower-level cache memory is faster than retrieval from higher-level cache memory. The highest level of cache memory is the last level of cache memory before accessing data from system memory. System memory contains the full physical address space for memory, while each level of the multi-level cache system does not. Since higher-level cache memory is shared by multiple PUs when a cache line is evicted from a lower-level cache memory, it may or may not be written to a higher-level cache memory. Heuristics or filters are applied to determine whether the evicted cache line is known to be useful (i.e., more likely to accessed again in cache memory before being evicted to system memory) and, if it is not, the cache line is opportunistic (i.e., less likely to be accessed again in cache memory before being evicted to system memory. Opportunistic cache lines have less importance than useful cache lines. However, some conventional cache allocation systems are designed to not allocate evicted cache lines that are not useful to a next higher-level cache. If a higher-level cache line in higher-level cache memory for which the lower-level cache line may be written has less or equal importance than the lower-level cache line, the lower-level cache line will replace the data at that location in order to better utilize the higher-level cache memory with more important cache lines. As an example, an unallocated invalid cache lines in the higher-level cache memory would get replaced with an opportunistic lower-level cache line. If, however, the higher-level cache line has more importance than the lower-level cache line, the lower-level cache line will not overwrite that higher-level location in order to not pollute the higher-level cache memory with less important data.

In this regard, exemplary aspects disclosed herein, when a lower-level cache line is evicted in a processor-based system, the processor-based system will determine whether the cache line is opportunistic. The processor-based system will set an opportunistic indicator to indicate that the lower-level cache line is opportunistic and communicate the lower-level cache line and the opportunistic indicator to a higher-level cache memory (e.g., a next higher-level cache memory). The processor-based system determines, based on the opportunistic indicator of the lower-level cache line, whether at least one higher-level cache line of a plurality of higher-level cache lines in the higher-level cache memory (e.g., a next higher-level cache memory) has less or equal importance than the lower-level cache line. In response to the determining a higher-level cache line in the higher-level cache memory has less or equal importance than the lower-level cache line, the processor-based system replaces the higher-level cache line in the higher-level cache memory with the lower-level cache line and associates the opportunistic indicator with the lower-level cache line in the higher-level cache memory. In this example, the higher-level cache memory is more highly utilized with more important cache lines.

For example, FIG. 1 is a block diagram of an exemplary processor-based system 100 that is configured to determine based on an opportunistic indicator associated with an evicted lower-level cache line, whether a higher-level cache line in the higher-level cache memory should be replaced with the evicted lower-level cache line. Before discussing these aspects, other exemplary aspects of the processor-based system 100 are first described below.

The processor-based system 100 includes multiple (multi-) central processing unit (CPU) (multi-CPU) processor 102 that includes multiple CPUs 104(0)-104(N) and a hierarchical memory system. As part of the hierarchical memory system, for example, CPU 104(0) includes a private local cache memory 106, which may be a Level 2 (L2) cache memory. CPUs 104(1), 104(2) and CPUs 104(N-1), CPU 104(N) are configured to interface with respective local shared cache memories 106S(0)-106S(X), which may also be L2 cache memories for example. If a data read request requested by a CPU 104(0)-104(N) results in a cache miss to the respective cache memories 106, 106S(0)-106S(X), the read request may be communicated to a next-level cache memory, which in this example is a shared system cache memory 108. For example, the shared cache memory 108 may be a Level 3 (L3) cache memory. The cache memory 106, the local shared cache memories 106S(0)-106S(X), and the shared cache memory 108 are part of a hierarchical cache memory system 110. An interconnect bus 112, which may be a coherent bus, is provided that allows each of the CPUs 104(0)-104(N) to access the shared cache memories 106S(0)-106S(X) (if shared to the CPU 104(0)-104(N)), the shared cache memory 108, and other shared resources coupled to the interconnect bus 112. The processor-based system 100 in FIG. 1 includes a cache allocation circuit 113 that is configured to allocate or write a cache line to a higher-level cache memory in response to an eviction request of a lower-level-cache line. Cache allocation circuit 113 may be distributed between a local cache allocation circuit 113(0), which resides in any or all CPUs 104(0-N), and the remote cache allocation circuit 113(1), which resides in multi-CPU processor 102. Remote cache allocation circuit 113(1) may alternatively reside in the interconnect bus 112 or any other higher-level cache memory, such as shared system cache memory 108. In this example, in response to an eviction request of a lower-level cache line from cache memory 106 or local shared cache memories 106S(0)-106S(X), cache allocation circuit 113 determines whether the lower-level cache line is opportunistic. An opportunistic cache line is less likely to be re-used by a subsequent memory address than a useful cache line. Varying heuristics, like the amount of time it takes to retrieve the lower-level cache line from higher-level cache memory, are applied to the lower-level cache line to determine whether the lower-level cache line is useful and, if it is not, the lower-level cache line is opportunistic. A threshold in determining between useful and opportunistic cache lines in heuristics can be programmed or defined by a designer. The local cache allocation circuit 113(0) sets an opportunistic indicator associated with the lower-level cache line to indicate whether the lower-level cache line is useful or opportunistic. The description associated with FIG. 3 will discuss an exemplary way to associate the opportunistic indicator with the lower-level cache line in more detail. The local cache allocation circuit 113(0) communicates the lower-level cache line and opportunistic indicator over interconnect bus 112 to the remote cache allocation circuit 113(1) in multi-CPU processor 102. In ARM® architected buses, user-defined bits in the ARM's defined architecture can be used to carry the opportunistic indicator between the local cache allocation circuit 113(0) and the remote cache allocation circuit 113(1).

The remote cache allocation circuit 113(1) determines, based on the opportunistic indicator of the lower-level cache line, whether a higher-level cache line of a plurality of higher-level cache lines in the higher-level cache memory, such as shared system cache memory 108 has less or equal importance than the lower-level cache line. For example, if the lower-level cache line is opportunistic and the higher-level cache line, which may be displaced by the lower-level cache line, is either opportunistic or invalid (has not been previously allocated), remote cache allocation circuit 113(1) replaces the higher-level cache line in shared system memory 108, with the lower-level cache line and associates the opportunistic indicator with the replaced higher-level cache line in the shared system cache memory 108.

Figure 2:
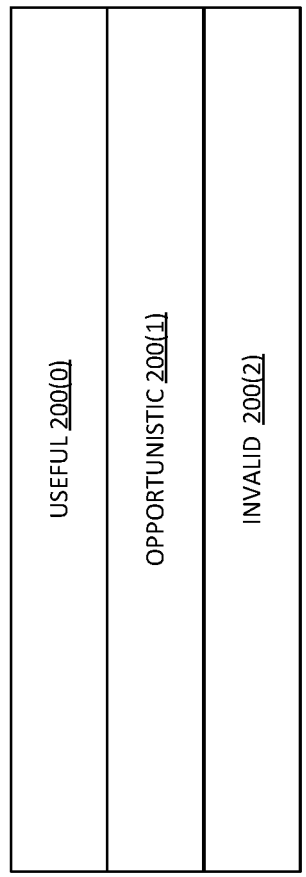
FIG. 2 is a hierarchy diagram illustrating an exemplary relative importance of cache lines in the shared cache system of FIG. 1.

FIG. 2 is a hierarchy diagram illustrating an exemplary relative importance of cache lines in the shared cache system of FIG. 1. At useful cache line 200(0) is more important than an opportunistic cache line 200(1) and an invalid cache line 200(2). An opportunistic cache line 200(1) is more important than an invalid cache line 200(2). When cache allocation circuit 113(1) compares the relative importance between a lower-level cache line in lower-level cache memory with a higher-level cache line in a higher-level cache memory, the cache allocation circuit 113(1) will replace the higher-level cache line if both lines are of the same importance.

With continuing reference to FIG. 1, the processor-based system 100 in this example also includes a snoop controller 114, which is also coupled to the interconnect bus 112. The snoop controller 114 is a circuit that monitors or snoops cache memory bus transactions on the interconnect bus 112 to maintain cache coherency among the cache memories 106, 106S(0)-106S(X), 108 in the cache memory system 110. Other shared resources that can be accessed by the CPUs 104(0)-104(N) through the interconnect bus 112 can include input/output (I/O) devices 116 and a system memory 118 (e.g., a dynamic random access memory (DRAM)). If a cache miss occurs for a read request issued by a CPU 104(0)-104(N) in each level of the cache memories 106, 106S(0)-106S(X), 108 accessible for the CPU 104(0)-104(N), the read request is serviced by the system memory 118, and the data associated with the read request is installed in the cache memories 106, 106S(0)-106S(X), 108 associated with the requested CPU 104(0)-104(N).

Figure 3:
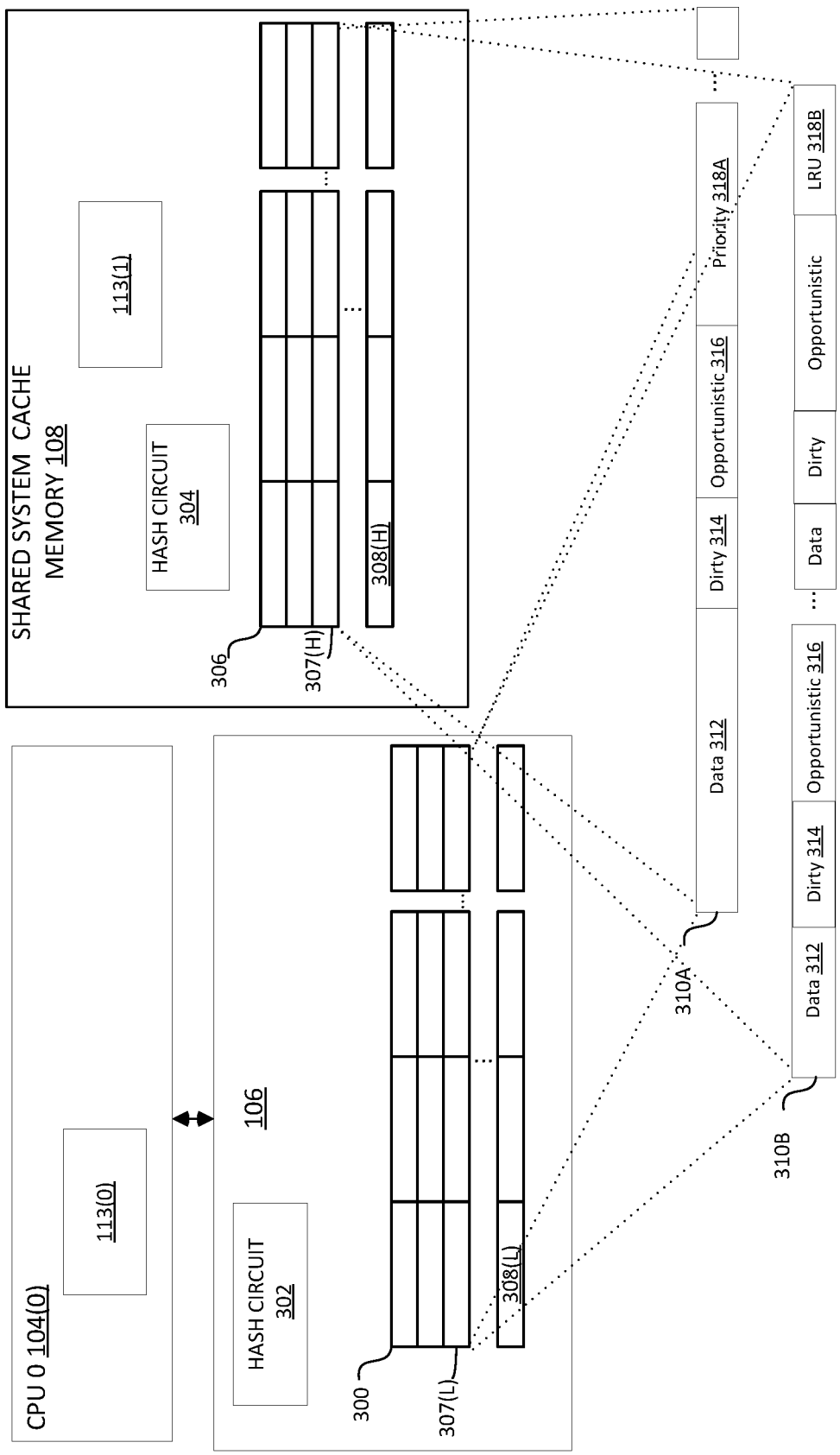
FIG. 3 is a block diagram of an exemplary CPU, a local cache, and a shared system cache memory of the cache memory system in FIG. 1 and two exemplary alternative formats of a cache line stored in the local cache and shared system cache memory.

FIG. 3 is a block diagram of CPU 0 104(0), local cache memory 106, and a shared system cache memory 108 of cache memory system 110 in FIG. 1 and two exemplary alternative formats of a cache way that can be stored in the local cache memory 106 and shared system cache memory 108. A cache way includes at least a set of cache lines that resolve to the same hash. FIG. 3 is also applicable to CPU 1-CPU N of FIG. 1 and shared L2 Cache memory 106S(0)-106S(X). Local cache memory 106 includes an M-way cache 300. CPU 0 includes hash circuit 302. Hash circuit 302 hashes a memory address to access a cache way comprising M cache lines in local cache memory 106. Shared system cache memory 108 includes a hash circuit 304 and an N-way cache 306. Hash circuit 304 hashes a memory address to access a cache way comprising N cache lines. In FIG. 3, all cache lines, in the same cache way, are shown in the same row of the M-way cache 300 and the N-way cache 306. M and N may or may not be equal.

Exemplary cache way 307(H) may have one of two alternative formats, format 310A or format 310B. Formats 310A and 310B are used to utilize a more granular importance hierarchy than the one in FIG. 2 when cache allocation circuit 113(1) selects between higher-level cache lines, in the same cache way, to be replaced by a lower-level cache line and will be discussed in connection with FIGS. 7 and 8. Exemplary cache way 307(L) may also utilize formats 310A or 310B.

Format 310A includes data 312, an optional dirty bit 314, an opportunistic indicator 316, and a priority indicator 318. Dirty bit 314 indicates whether exemplary cache line 308(L) or 308(H) has been written to since being initially stored in M-way cache 300 or N-way cache 306, respectively. Opportunistic indicator 316 indicates whether exemplary cache line 308(L) or 308(H) is useful or opportunistic. Priority indicator 318A is utilized when cache memory 106 or shared system cache memory 108 deploys a modified not least recently used technique when selecting between cache lines, in the same cache way, to be replaced. Priority indicator 318A is set when a cache line is read and reset when all the cache lines, in the same cache way, have all been read. When selecting between cache lines, in the cache same way, to be replaced, the priority and opportunistic indicators are utilized to determine which of the cache lines, in the same cache way, is the least important, which will be discussed further in connection with FIGS. 7-8.

Alternative format 310B includes data 312, optional dirty bit 314, and an opportunistic indicator 316 for each allocated cache line in the same cache way and an LRU field 318B for the cache way, which is encoded to maintain a least recently used order of all the cache lines in the same cache way. LRU field 318B is utilized when cache memory 106 or shared system cache memory 108 deploy a modified least recently used technique when selecting between cache lines, in the same cache way, to be replaced.

Formats 310A and 310B are also utilized by cache allocation circuit 113(1) to select between higher-level cache lines in the same way, which will be discussed further in connection with FIGS. 7-8.

Figure 4:
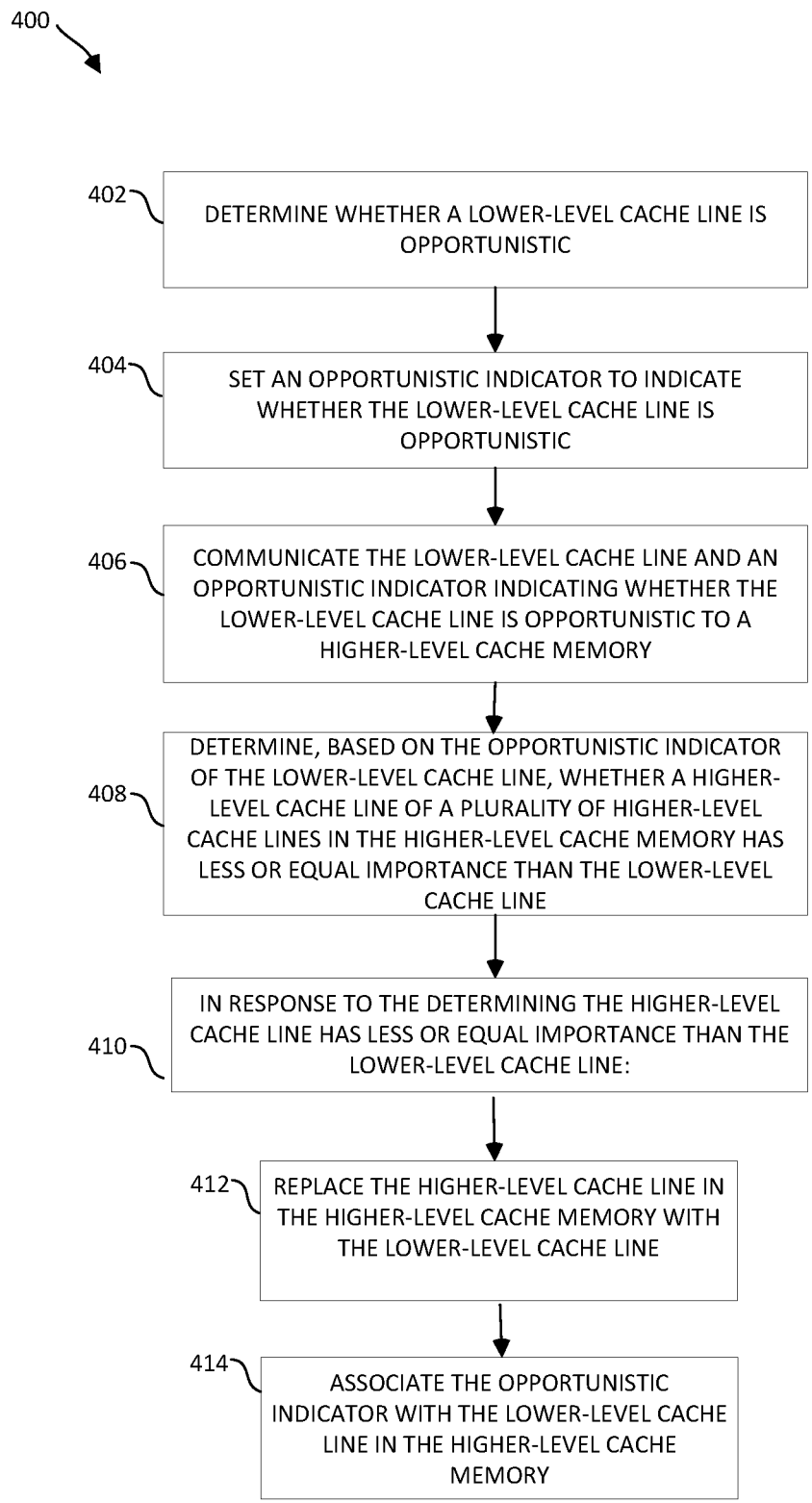
FIG. 4 is a flowchart illustrating an exemplary process for allocating a lower-level cache line from a lower-level cache memory to a higher-level cache memory in a processor-based system including the processor-based system in FIGS. 1 and 3.

FIG. 4 is a flowchart illustrating an exemplary process 400 for allocating a lower-level cache line from a lower-level cache memory to a higher-level cache memory in a processor-based system including processor-based system in FIGS. 1 and 3. In response to an eviction request of a lower-level cache line in a lower-level cache memory, process 400, at block 402, determines whether the lower-level cache line is opportunistic. Heuristics are run to classify whether the lower-level cache line is useful or opportunistic, as described in connection with FIG. 1. Based on the heuristics, at block 404, process 400 sets the opportunistic indicator associated with the lower-level cache line. Alternatively, to blocks 402 and 404, the lower-level cache line may have had its opportunistic indicator 316 previously set so that heuristics do not need to be run. This situation can occur if the lower-level cache line had been previously evicted to a higher-level cache memory, which would have resulted in saving the opportunistic indicator with the cache line when it was stored to the high-level cache. More details of this situation are discussed in connection with FIG. 6. At block 406, process 400 communicates the lower-level cache line and associated opportunistic indicator indicating whether the lower-level cache line is opportunistic to a higher-level cache memory. In the case of a distributed cache allocation circuit, cache allocation circuit 113(0) performs blocks 402-406.

At block 408, process 400 determines, based on the opportunistic indicator of the lower-level cache line, whether a higher-level cache line of a plurality of higher-level cache lines in the higher-level cache memory has less or equal importance than the lower-level cache line. At block 410, process 400 addresses a logic path when block 408 has determined that the higher-level cache line has less or equal importance than the lower-level cache line. In response to determining the higher-level cache line has less or equal importance than the lower-level cache line, process 400 at block 414 replaces the higher-level cache line in the higher-level cache memory with the lower-level cache line and, at block 414, associates the opportunistic indicator of the lower-level cache line to the replaced higher-level cache line in the higher-level cache memory.

Figure 5:
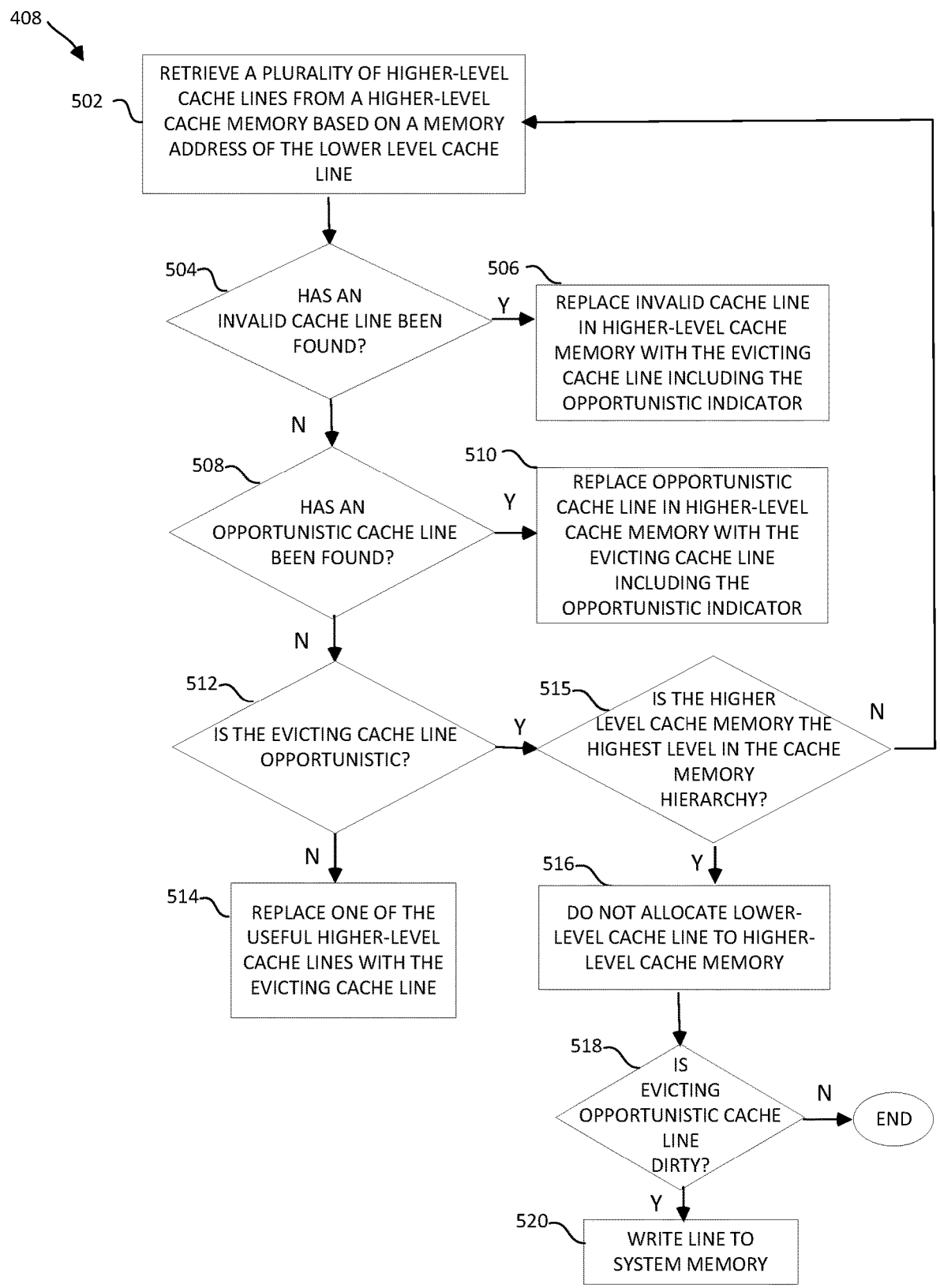
FIG. 5 is a flowchart illustrating an exemplary process for determining whether the lower-level cache line has less or equal importance than a higher-level cache line in the exemplary process of FIG. 4.

FIG. 5 is a flowchart expands block 408, determining whether the lower-level cache line has less or equal importance than a higher-level cache line in the exemplary process of FIG. 4. At block 502, process 400 retrieves a plurality of higher-level cache lines from a higher-level cache, such as shared system cache memory 108, based on a memory address of the lower-level cache line. For example, hash circuit 304 hashes the memory address to provide access to cache allocation circuit 113(1) to N higher-level cache lines from the N-way cache 306 in the higher-level cache. At block 504, process 400 determines if there is at least one invalid cache line from the set of N higher-level cache lines. If there is at least one invalid cache line, process 400, at block 506, replaces one invalid cache line with the lower-level cache line, including the opportunistic indicator associated with the lower-level cache line in the higher-level cache.

If there are no invalid cache lines in the set of N higher-level cache lines, process 400 proceeds to block 508 and determines if there is at least one opportunistic cache line from the set of N higher-level cache lines. If there is at least one opportunistic cache line in the set of N higher-level cache lines, process 400 proceeds to block 510 and replaces one opportunistic higher-level cache line with the lower-level cache line, including the opportunistic indicator associated with the lower-level cache line in the higher-level cache.

If there is not at least one opportunistic cache line in the set of N higher-level cache lines, process 400 proceeds to block 512 and checks the opportunistic indicator of the lower-level cache line, also known as the evicted lower-level cache line since, at this point in process 400, there are no invalid or opportunistic cache lines in the set of N higher-level cache lines, and thus all the cache lines in the set of N higher-level cache lines are useful. If the opportunistic indicator indicates that the lower-level cache line is also useful, process 400 proceeds to block 514 and selects the least recently used higher-level useful cache line to replace with the lower-level cache line, including the opportunistic indicator of the lower-level cache line.

If the opportunistic indicator indicates that the lower-level cache line is opportunistic, process 400 proceeds to optional block 515 to determine if the higher-level cache memory is the highest level in the cache memory hierarchy. If it isn't, process 400 repeats the blocks starting at block 500 for the next higher-level cache memory in the cache memory hierarchy. If the higher-level cache memory is the highest level or optional block 515 doesn't exist, process 400 proceeds to block 516 and does not allocate the lower-level cache line to a higher-level cache memory. Process 400 proceeds to block 518 and reads the associated dirty bit 314 of the lower-level cache line. If the lower-level cache line is not dirty, meaning it has not been written to while in the lower-level cache, process 400 ends. If the lower-level cache line is dirty, process 400 proceeds to block 520 to write the lower-level cache line to system memory 118. Cache allocation circuit 113(1) performs blocks 504-520.

If there is more than one opportunistic cache line in the set of N high-level cache lines, which may occur at blocks 508 and 510, or there is more than one useful cache line in the set of N higher-level cache lines, which can occur in blocks 512 and 514, process 400 utilizes either a modified least recently used or a modified not recently used technique to select one of the high-level cache lines to victimize. Tie-breaking among the set of N high-level cache lines to victimize will be discussed further in connection with FIGS. 7 and 8.

Figure 6:
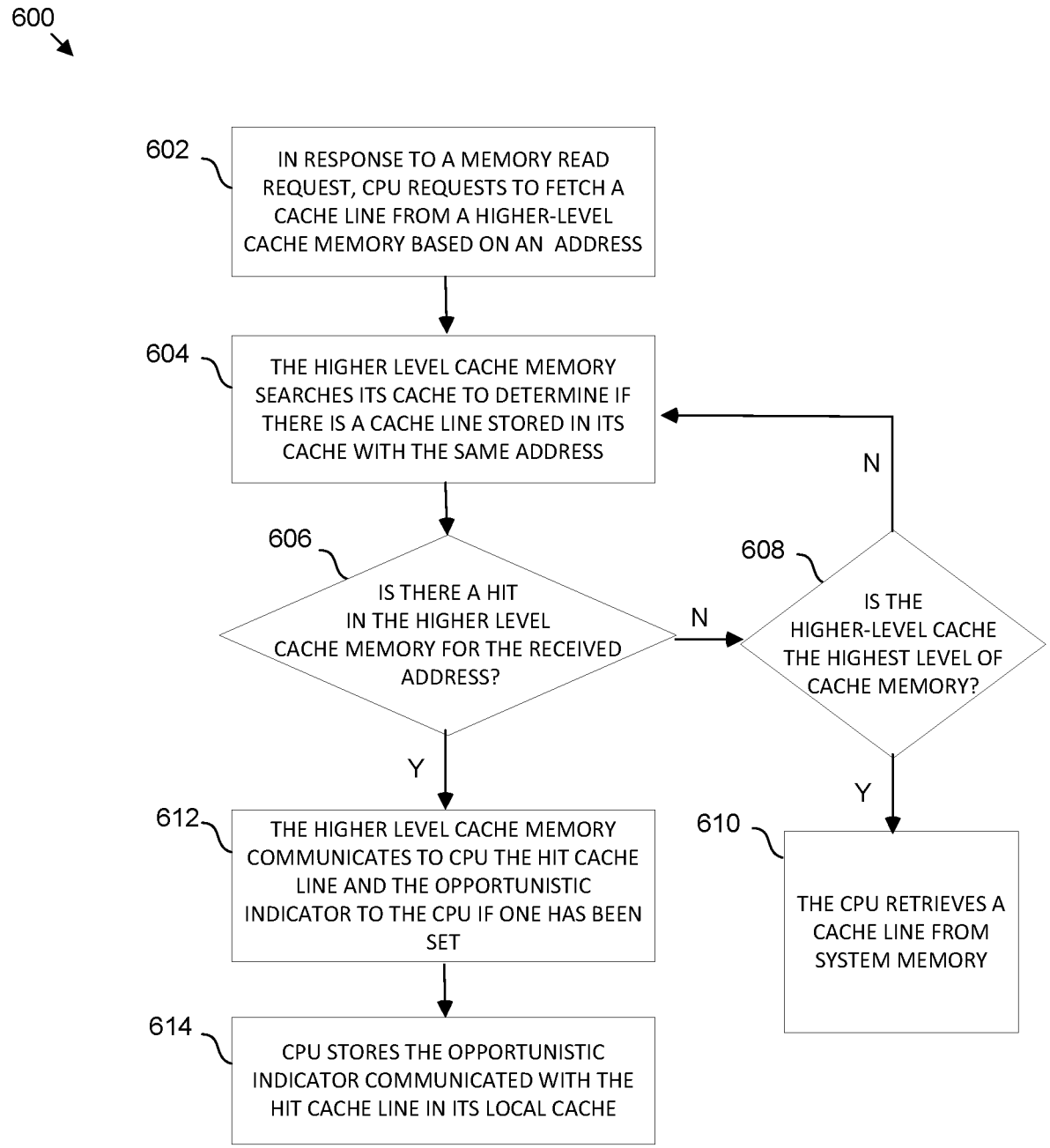
FIG. 6 is a flowchart illustrating an exemplary process for retrieving an opportunistic indicator for a cache line that has been previously determined opportunistic.

FIG. 6 is a flowchart illustrating an exemplary process 600 for retrieving an opportunistic indicator for a cache line that has been previously determined opportunistic. Doing so allows the cache allocation circuit 113(0) to store the opportunistic indicator with a cache line retrieved from the higher-level cache memory and leverage the stored opportunistic indicator in the lower-level cache memory to determine whether the retrieved cache line is useful or opportunistic. At block 602, process 600, in response to a memory read request, a CPU, such as CPU0 104(0), requests to fetch a cache line from a higher-level cache memory, such as shared system cache memory 108, based on an address. At block 604, process 600 searches the higher-level cache memory to determine if a cache line is stored with the same address. At block 606, process 600 determines if the address hits the higher-level cache memory. If there is no hit in the higher-level cache memory, process 600 proceeds to block 608. If the higher-level cache memory is the highest level of cache memory, process 600 proceeds to block 610, where the CPU retrieves a cache line from system memory, such as system memory 118. Otherwise, the address would be passed to the next higher level of cache memory, and process 600 would proceed to block 604 to process the next higher level of cache memory.

Returning to block 606, if there is a hit in the higher-level cache memory for the address, process 600 proceeds to block 612, where the higher-level-cache memory communicates to the CPU the hit cache line and the opportunistic indicator associated with the hit cache line if one has been set. At block 614, the CPU stores the opportunistic indicator with the hit cache line in its local cache, such as private L2 cache memory 106.

Figure 7B:
FIG. 7B is a hierarchy diagram illustrating a further example of the relative importance hierarchy in FIG. 2 when the cache allocation circuit of FIG. 3 utilizes a modified not recently used technique to select between higher-level cache lines in the same way in the higher-level cache memory of FIG. 1 for eviction.
Figure 7A:
FIG. 7A is a hierarchy diagram illustrating a further example of the relative importance hierarchy in FIG. 2 when a cache allocation circuit utilizes a modified least recently used technique to select between higher-level cache lines in the same cache way in the higher-level cache memory.
Figure 8A:
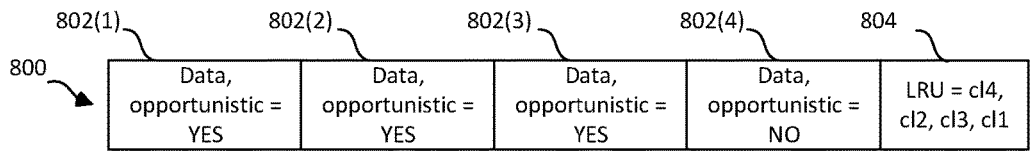
FIG. 8A illustrates two examples of four (4) higher-level cache lines returned in a 4-way higher-level cache to demonstrate an example of selecting among the higher-level cache lines to victimize when allocating a victimized cache line from a lower-level cache memory utilizing a modified least recently used approach.
Figure 8A:
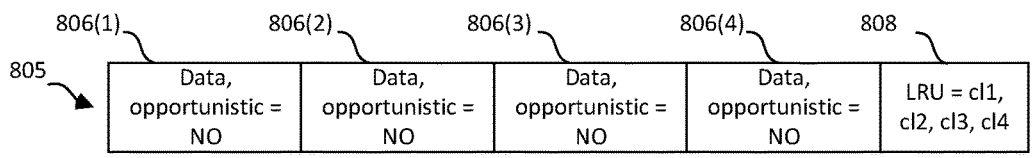

FIG. 7A is a hierarchy diagram illustrating a further example of the relative importance hierarchy in FIG. 2 when cache allocation circuit 113(1) of FIG. 3 utilizes a modified least recently used technique to select between higher-level cache lines in the same cache way in the higher-level cache memory for eviction and will be discussed in connection with FIG. 8A. FIG. 8A includes two examples of four (4) higher-level cache lines returned in a 4-way higher-level cache memory to demonstrate selecting among the higher-level cache lines to victimize when allocating a victimized cache line from a lower-level cache utilizing a modified not least recently used approach. In these examples, the N-way cache 306 of shared system cache memory 108 is a 4-way cache.

Returning to FIG. 7A, under a useful cache line 200(0), there are exemplary three levels of usefulness in hierarchical order; useful and most recently used 702(0), useful and in between least recently used and most recently used 702(1), and useful and least recently used 702(2). Under an opportunistic cache line 200(1), there are three levels of opportunistic in hierarchical order; opportunistic and most recently used 704(0), opportunistic and in between least recently used and most recently used 704(1), and opportunistic and least recently used 704(2). This hierarchy is used when cache allocation circuit 113(1) selects between higher-level cache lines in the same way as a higher-level cache memory to be replaced with a more important lower-level cache line. The actual number of levels of usefulness and opportunism are dependent on the number of ways in a cache. For example, an M-way cache will have M levels of usefulness and M levels of opportunism since each cache line, in a cache way, will be tracked in order using a modified least recently used technique.

In example 800, 4 cache lines 802(1), 802(2), 802(3), and 802(4) and LRU 804 were returned for a memory address that also corresponds to a victimized lower-level cache line. Cache allocation circuit 113(1) selects between cache lines. 802(1), 802(2), 803(3), and 802(4) to victimize in order to be replaced with the victimized lower-level cache line. LRU 804 maintains the order in which cache lines 802(1), 802(2), 802(3) and 802(4) were most recently used. As shown in FIG. 8A, cache line 802(4) is the most recently used, followed by cache line 802(2), followed by cache line 802(3), followed by cache line 802(1). The coding of cache lines 802(1), 802(2), 802(3) and 802(4) follow the format 310B in FIG. 3. If the victimized lower-level cache line is either opportunistic or useful, one of higher-level cache lines 802(1), 802(2), or 802(3) will be selected to be replaced by cache allocation circuit 113(1) since cache lines 802(1), 802(2), and 802(3) are also opportunistic and less important than the victimized lower-level cache line. To break the tie, cache allocation circuit 113(1) reads LRU 804 and determines that cache line 802(1) is the least recently used opportunistic cache line and, thus, victimizes higher-level cache line 802(1) and replaces it with the victimized lower-level cache line. In example 800, cache allocation circuit 113(1) followed the path of blocks 502, 504, 508, and 510 of process 400 in FIG. 5. The modified least recently used technique supplements the conventional least recently used technique to break ties by limiting the selection of cache lines in the same cache way to ones that are equal to or less important than the lower-level cache line for which a replacement is sought.

In example 805, the four higher-level cache lines 806(1), 806(2), 806(3), and 806(4) have been returned for a memory address that corresponds to a victimized lower-level cache line. Higher-level cache lines 806(1), 806(2), 806(3), and 806(4) have their opportunistic indicators set to NO such that they are all useful. If the victimized lower-level cache line is opportunistic, the lower-level cache line will not replace any of cache lines 806(1), 806(2), 806(3), and 806(4) because the victimized cache line has less or equal importance than the useful higher-level cache lines 806(1), 806(2), 806(3), and 806(4). Cache allocation circuit 113(1) will follow process 400 at block 516 in FIG. 5 in this situation. If the victimized lower-level cache line is useful, then cache allocation circuit 113(1) selects between useful higher-level cache lines 806(1), 806(2), 806(3), and 806(4) by reading LRU 808 and determining that cache line 806(4) is the least recently used useful higher-level cache line and, thus, victimizes higher-level cache line 806(4) with the victimized lower-level cache line which follows process 400 at block 514 in FIG. 5.

FIG. 7B is a hierarchy diagram illustrating a further example of the relative importance hierarchy in FIG. 2 when the cache allocation circuit of FIG. 3 utilizes a modified not recently used technique to select between higher-level cache lines in the same way in the higher-level cache memory, such as shared system cache memory 108, for eviction. FIG. 7B will be discussed in connection with FIG. 8B, which includes two examples of four (4) higher-level cache lines returned in a 4-way higher-level cache to demonstrate selecting among the higher-level cache lines to victimize when allocating a victimized cache line from a lower-level cache utilizing a modified not recently used approach. In these examples, the N-way cache 306 of shared system cache memory 108 is a 4-way cache.

Returning to FIG. 7B, under a useful cache line 200(0), there are two levels of usefulness in hierarchical order: useful and high priority 706(0), and useful and low priority 706(1). Under an opportunistic cache line 200(1), there are two levels of opportunistic in hierarchical order: opportunistic and high priority 708(0), and opportunistic and low priority 708(1). This hierarchy is used when cache allocation circuit 113(1) selects between higher-level cache lines in the same way as a higher-level cache memory to be victimized with a more important lower-level cache line.

Figure 8B:
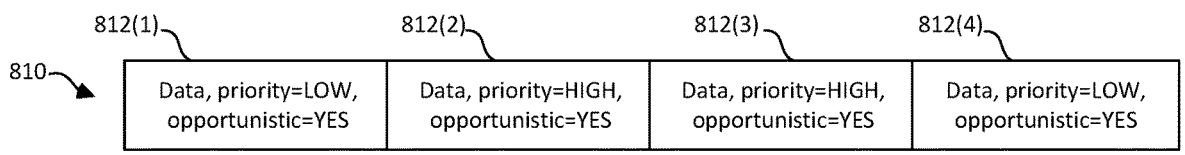
FIG. 8B illustrates two examples of four (4) higher-level cache lines returned in a 4-way higher-level cache to demonstrate an example of selecting among the higher-level cache lines to victimize when allocating a victimized cache line from a lower-level cache utilizing a modified not recently used approach.
Figure 8B:
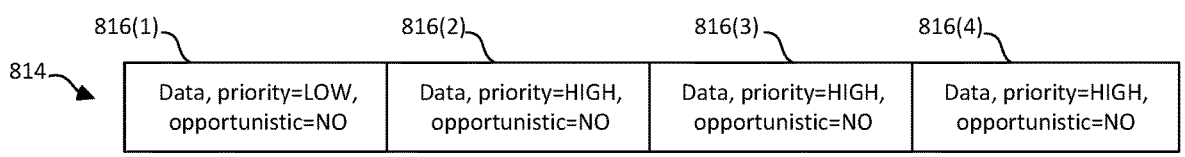

In example 810, four cache lines 812(1), 812(2), 812(3), and 812(4) were returned for a memory address that also corresponds to a victimized lower-level cache line. Cache allocation circuit 113(1) selects between cache lines 812(1), 812(2), 812(3), and 812(4) to victimize in order to be replaced with the victimized lower-level cache line. As shown in FIG. 8B, all the cache lines have their opportunistic indicators set to YES, cache lines 812(1) and 812(4) have their priority indicators set to LOW, and cache lines 812(2) and 812(3) have their priority indicators set to HIGH. Using the modified not recently used technique, cache lines 812(1) and 812(4) were written in the past longer than cache lines 812(2) and 812(3). In the modified, not recently used technique, whenever a cache line is written, its associated priority indicator is set to HIGH. When the last of the cache lines in the same cache way is set to HIGH, the remaining cache lines' priority indicators are set to LOW. The coding of cache lines 812(1), 812(2), 812(3) and 812(4) follow the format 310A in FIG. 3. If the victimized lower-level cache line is either opportunistic or useful, one of higher-level cache lines 812(1), 812(2), 812(3) or 812(4) will be selected to be replaced by cache allocation circuit 113(1) since cache lines 812(1), 812(2), 812(3) or 812(4) are all opportunistic and less important than the victimized lower-level cache line. To break the tie, cache allocation circuit 113(1) will read the cache lines' priority indicator and narrow down the selection to cache lines 812(1) and 812(4) since they both are LOW priority. Cache allocation circuit 113(1) randomly selects between cache lines 812(1) and 812(4) to victimize. In example 810, cache allocation circuit 113(1) followed the path of blocks 502, 504, 508, and 510 of process 400 in FIG. 5.

In example 814, the four higher-level cache lines 816(1), 816(2), 816(3), and 816(4) have been returned for a memory address that corresponds to a victimized lower-level cache line. Higher-level cache lines 816(1), 816(2), 816(3), and 816(4) have their opportunistic indicators set to NO such that they are all useful. If the victimized lower-level cache line is opportunistic, the lower-level cache line will not replace any of cache lines 816(1), 816(2), 816(3), and 816(4) because the victimized cache line has less or equal importance than the useful higher-level cache lines 816(1), 816(2), 816(3), and 816(4). Cache allocation circuit 113(1) will follow process 400 at block 516 in FIG. 5 in this situation. If the victimized lower-level cache line is useful, then cache allocation circuit 113(1) selects between useful higher-level cache lines 816(1), 816(2), 816(3), and 816(4) by reading their respective priority indicators and determining that cache line 816(1) is the only low priority useful higher-level cache line and, thus, victimizes cache line 816(1) with the victimized lower-level cache line. Cache allocation circuit 113(1) follows the path of blocks 502, 504, 508, 512, and 514 of process 400 in FIG. 5.

The modified not recently used technique supplements the conventional not recently used technique to break ties among opportunistic cache lines or useful cache lines through use of the priority indicator setting. Unlike the modified least recently used technique described in connection with FIGS. 7A and 8A, the modified not least recently used technique narrows the choices of cache lines in the same cache way and may have to randomly select between the narrowed choices.

Figure 9:
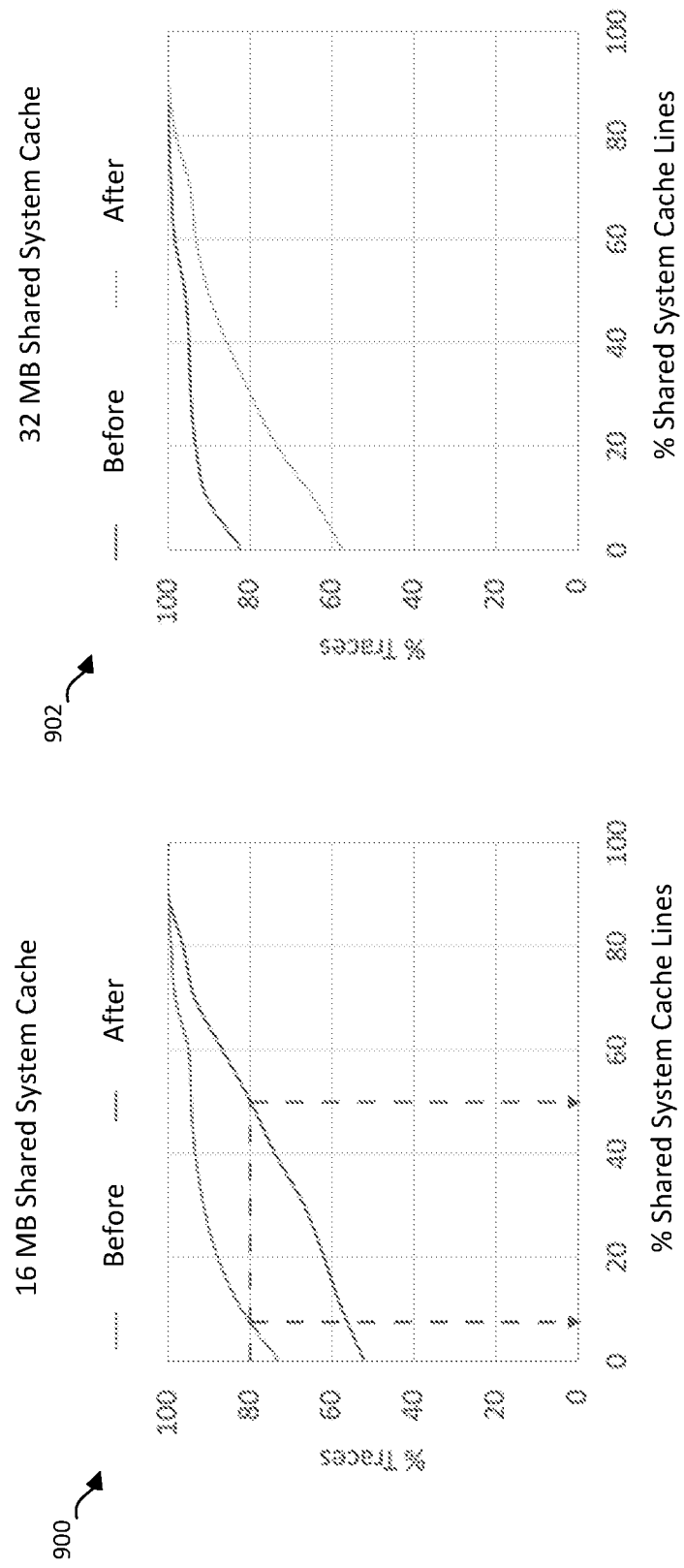
FIG. 9 illustrates two graphs showing the utilization of the higher-level cache memory of FIGS. 1 and 3 before and after utilizing the cache allocation circuit of FIGS. 1 and 3.

FIG. 9 illustrates two graphs showing the utilization of the higher-level cache memory of FIGS. 1 and 3 before and after utilizing the cache allocation circuit of FIGS. 1 and 3. Graph 900 shows system cache memory 108 of FIG. 1 configured to be 16 MB. Graph 902 shows system cache memory 108 of FIG. 1 configured to be 32 MB. Graphs 900 and 902 illustrate before and after utilizing cache allocation circuit 113. The y-axis shows the percentage of tests or traces. These tests include various industry standard benchmarks including SPEC CPU20017, GeekBench, and the like. The x-axis shows the percentage of shared system cache lines that are in use, i.e., not-invalid. For example, 15% point on the x-axis means only 15% of the system cache memory is actually being allocated and in use. Referring to graph 900 at the 80% horizontal line representing completion of 80% of the tests, before utilizing cache allocation circuit 113, less than 10% of the system cache memory was in use. After using cache allocation circuit 113, 50% of the system cache memory was in use. As shown in graphs 900 and 902, the utilization of share system cache memory 108, in both configurations, has higher utilization at the same levels of percentage of cache tests.

Electronic devices that include a processor-based system that includes multiple central processing units and a memory system that includes a cache memory system including a hierarchy of local and shared cache memories and a system memory as in FIG. 1 and a cache allocation circuit as shown in FIGS. 1 and 3 to, in response to an eviction request of a lower-level cache line, determine whether the lower-level cache line is opportunistic and replace a higher-level cache line with the lower-level cache line if the higher-level cache line has less or equal importance than the lower-level cache line and according to any aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, laptop computer, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 10:
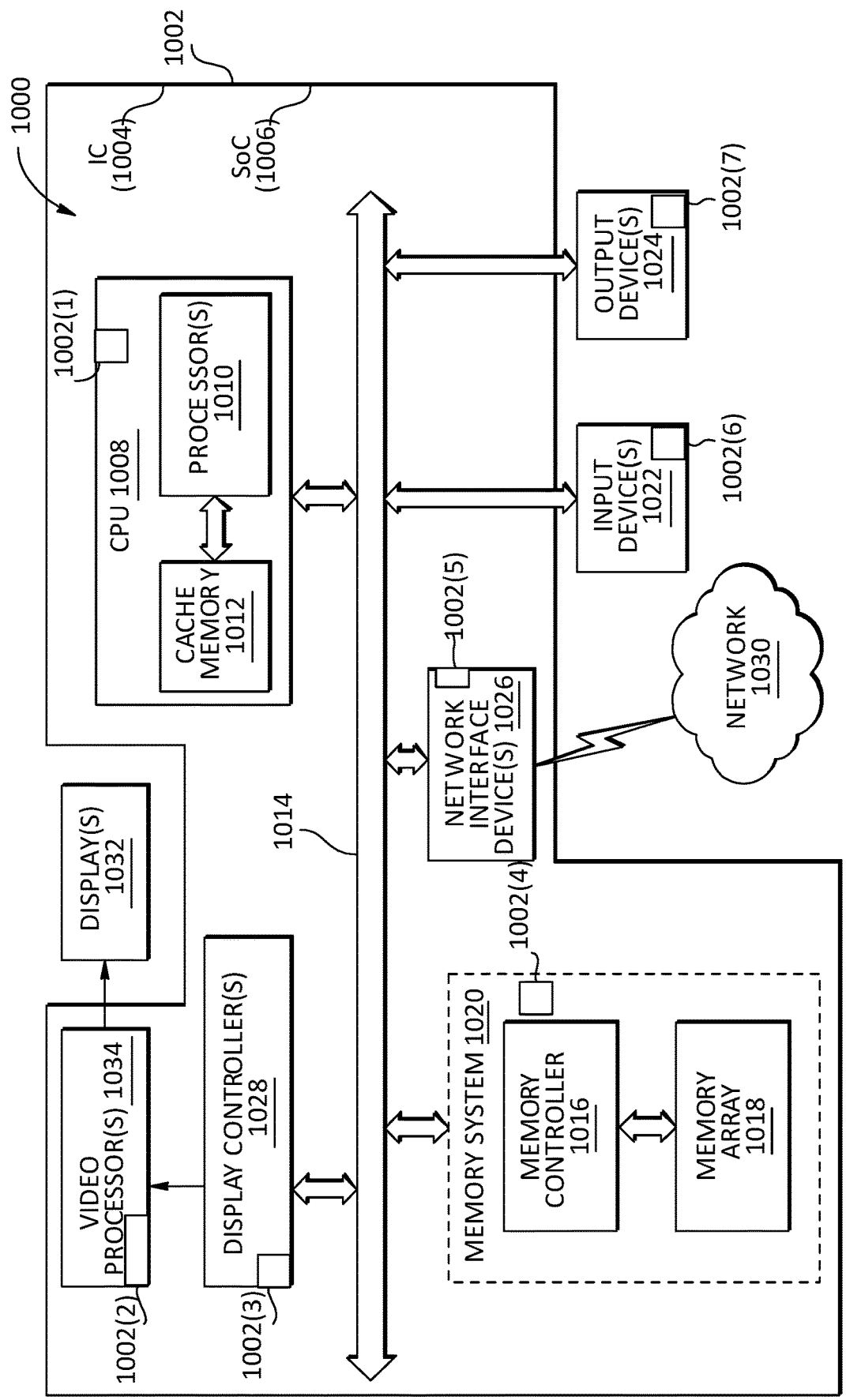
FIG. 10 is a block diagram of an exemplary processor-based system that can include a cache allocation circuit of FIGS. 1 and 3 for allocating opportunistic lines to a higher-level cache memory.

In this regard, FIG. 10 illustrates an example of a processor-based system 100 that can include a cache allocation circuit of FIGS. 1 and 3 that, in response to an eviction request of a lower-level cache line, determines whether the lower-level cache line is opportunistic and replaces a higher-level cache line in a higher level cache memory if the higher-level cache line has less or equal importance than the lower-level cache line and according to any exemplary aspects disclosed herein. In this example, the processor-based system 1000 may be formed as an integrated circuit (IC) 1004 and include cache allocation circuit 1002, such as the cache allocation circuit 113 described in FIGS. 1 and 3, and deployed as a system-on-a-chip (SoC) 1006. The processor-based system 1000 includes a central processing unit (CPU) 1008 that includes one or more processors 1010, which may also be referred to as CPU cores or processor cores. The CPU 1008 may have cache memory 1012 coupled to the CPU 1008 for rapid access to temporarily stored data. The CPU 1008 is coupled to a system bus 1014 and can intercouple master and slave devices included in the processor-based system 1000. As is well known, the CPU 1008 communicates with these other devices by exchanging address, control, and data information over the system bus 1014. For example, the CPU 1008 can communicate bus transaction requests to a memory controller 1016, as an example of a slave device. Although not illustrated in FIG. 10, multiple system buses 1014 could be provided, wherein each system bus 1014 constitutes a different fabric.

Other master and slave devices can be connected to the system bus 1014. As illustrated in FIG. 10, these devices can include a memory system 1020 that includes the memory controller 1016 and a memory array(s) 1018, one or more input devices 1022, one or more output devices 1024, one or more network interface devices 1026, and one or more display controllers 1028, as examples. Each of the memory system(s) 1020, the one or more input devices 1022, the one or more output devices 1024, the one or more network interface devices 1026, and the one or more display controllers 1028 can be provided in the same or different electronic devices. The input device(s) 1022 can include any type of input device, including, but not limited to, input keys, switches, voice processors, etc. The output device(s) 1024 can include any type of output device, including, but not limited to, audio, video, other visual indicators, etc. The network interface device(s) 1026 can be any device configured to allow an exchange of data to and from a network 1030. The network 1030 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1026 can be configured to support any type of communications protocol desired.

The CPU 1008 may also be configured to access the display controller(s) 1028 over the system bus 1014 to control information sent to one or more displays 1032. The display controller(s) 1028 sends information to the display(s) 1032 to be displayed via one or more video processor(s) 1034, which process the information to be displayed into a format suitable for the display(s) 1032. The display controller(s) 1028 and video processor(s) 1034 can be included as ICs in the same or different electronic devices and in the same or different electronic device containing the CPU 1008, for example. The display(s) 1032 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations.

Thus, the disclosure is not intended to be limited to the examples and designs described herein but is to be accorded the widest scope consistent with the principles and novel features disclosed herein.

Implementation examples are described in the following numbered clauses:

1. A processor-based system for allocating a cache line to a higher-level cache memory, comprising:
    a lower-level cache memory configured to store data;
    the processor-based system configured to, in response to an eviction request of a lower-level cache line in the lower-level cache memory:
      determine whether the lower-level cache line is opportunistic;
      set an opportunistic indicator to indicate whether the lower-level cache line is opportunistic;
      communicate the lower-level cache line and the opportunistic indicator indicating that the lower-level cache line is opportunistic to the higher-level cache memory;
      determine, based on the opportunistic indicator of the lower-level cache line, whether a higher-level cache line of a plurality of higher-level cache lines in the higher-level cache memory has less or equal importance than the lower-level cache line; and
      in response to the determining the higher-level cache line has less or equal importance than the lower-level cache line:
        replace the higher-level cache line in the higher-level cache memory with the lower-level cache line; and
        associate the opportunistic indicator of the lower-level cache line in the higher-level cache memory.

2. The processor-based system of clause 1, configured to determine whether the higher-level cache line of the plurality of higher-level cache lines in the higher-level cache memory has less or equal importance than the lower-level cache line by being configured to:
    determine whether the higher-level cache line in the higher-level cache memory is invalid; and
    in response to the determining the higher-level cache line in the higher-level cache memory is invalid:
      replace the higher-level cache line in the higher-level cache memory with the lower-level cache line; and
      associate the opportunistic indicator of the lower-level cache line in the higher-level cache memory.

3. The processor-based system of clause 2, further configured, in response to determining whether the higher-level cache line in the higher-level cache memory is not invalid, by being configured to:
    determine based on a second opportunistic indicator of the higher-level cache line whether the higher-level cache line in the higher-level cache memory is opportunistic; and
    in response to the determining the second opportunistic indicator of the higher-level cache line is opportunistic:
      replace the higher-level cache line in the higher-level cache memory with the lower-level cache line; and
      associate the opportunistic indicator of the lower-level cache line in the higher-level cache memory.

4. The processor-based system of clause 3, further configured, in response to determining whether the higher-level cache line in the higher-level cache memory is not opportunistic, to:
    determine based on a dirty indicator of the lower-level cache line whether the lower-level cache line is dirty; and
    in response to the determining the dirty indicator of the lower-level cache line is dirty:
      write the lower-level cache line to a system memory.

5. The processor-based system of clauses 1-4, wherein the opportunistic indicator indicates that the lower-level cache line is opportunistic.

6. The processor-based system of clauses 1-5, configured to determine whether the higher-level cache line in the higher-level cache memory has less or equal importance than the lower-level cache line by being configured to:
    determine if a first higher-level cache line has less or equal importance than the lower-level cache line;
    determine if a second higher-level cache line has less or equal importance than the lower-level cache line; and
    in response to determining the first higher-level cache line has less or equal importance than the lower-level cache line and the second higher-level cache line has less or equal importance than the lower-level cache line:
      determine if the first higher-level cache line has less or equal importance than the second higher-level cache line; and
      in response to determining that the first higher-level cache line has less or equal importance than the second higher-level cache line:
        replace the first higher-level cache line in the higher-level cache memory with the lower-level cache line, and
        associate the opportunistic indicator of the lower-level cache line in the higher-level cache memory.

7. The processor-based system of clauses 1-6, configured to determine if the first higher-level cache line has less or equal importance than the second higher-level cache line by being configured to:
    determine if the first higher-level cache line is invalid;
    determine if the second higher-level cache line is not invalid; and
    in response to determining that the first higher-level cache line is invalid and the second higher-level cache line is not invalid:
      replace the first higher-level cache line in the higher-level cache memory with the lower-level cache line; and
      associate the opportunistic indicator of the lower-level cache line in the higher-level cache memory.

8. The processor-based system of clause 7, further configured, in response to determining that the first higher-level cache line is not invalid and the second higher-level cache line is not invalid, by being configured to:
    determine a first priority indicator of the first higher-level cache line and a second priority indicator of the second higher-level cache line; and
    in response to determining that the first priority indicator of the first higher-level cache line is less recently used than the second priority indicator of the second higher-level cache line:
      replace the first higher-level cache line in the higher-level cache memory with the lower-level cache line; and
      associate the opportunistic indicator of the lower-level cache line in the higher-level cache memory.

9. The processor-based system of clause 7, further configured, in response to determining that the first higher-level cache line is not invalid and the second higher-level cache line is not invalid, by being configured to:
   determine a LRU indicator tracking an order of a plurality of least recently used cache lines, including the first higher-level cache line and the second higher-level cache line; and
   in response to determining that the LRU indicator indicates the first higher-level cache line is less recently used than the second higher-level cache line:
      replace the first higher-level cache line in the higher-level cache memory with the lower-level cache line; and
      associate the opportunistic indicator of the lower-level cache line in the higher-level cache memory.
10. The processor-based system of clauses 1-9, configured to associate the opportunistic indicator of the lower-level cache line in the higher-level cache memory by being configured to:
   store the opportunistic indicator of the lower-level cache line in the higher-level cache line.
11. The processor-based system of clauses 1-10 integrated into an integrated circuit (IC).
12. The processor-based system of clauses 1-11 integrated into a device selected from a group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.
13. A method for allocating a cache line to a higher-level cache memory in response to an eviction request of a lower-level cache line in a lower-level cache memory, comprising:
   determining whether the lower-level cache line is opportunistic;
   setting an opportunistic indicator to indicate whether the lower-level cache line is opportunistic;
   communicating the lower-level cache line and the opportunistic indicator indicating that the lower-level cache line is opportunistic to the higher-level cache memory;
   determining, based on the opportunistic indicator of the lower-level cache line, whether a higher-level cache line of a plurality of higher-level cache lines in the higher-level cache memory has less or equal importance than the lower-level cache line; and
   in response to the determining the higher-level cache line has less or equal importance than the lower-level cache line:
      replacing the higher-level cache line in the higher-level cache memory with the lower-level cache line; and
      associating the opportunistic indicator of the lower-level cache line in the higher-level cache memory.
14. The method of clause 13, wherein determining whether the higher-level cache line of the plurality of higher-level cache lines in the higher-level cache memory has less or equal importance than the lower-level cache line comprises:
   determining whether the higher-level cache line in the higher-level cache memory is invalid; and
   in response to the determining the higher-level cache line in the higher-level cache memory is invalid:
      replacing the higher-level cache line in the higher-level cache memory with the lower-level cache line; and
      associating the opportunistic indicator of the lower-level cache line in the higher-level cache memory.
15. The method of clause 14, wherein, in response to determining whether the higher-level cache line in the higher-level cache memory is not invalid, further comprising:
   determining based on a second opportunistic indicator of the higher-level cache line whether the higher-level cache line in the higher-level cache memory is opportunistic; and
   in response to the determining the second opportunistic indicator of the higher-level cache line is opportunistic:
      replacing the higher-level cache line in the higher-level cache memory with the lower-level cache line; and
      associating the opportunistic indicator of the lower-level cache line in the higher-level cache memory.
16. The method of clause 15, wherein, in response to determining whether the higher-level cache line in the higher-level cache memory is not opportunistic, comprising:
   determining based on a dirty indicator of the lower-level cache line whether the lower-level cache line is dirty; and
   in response to the determining the dirty indicator of the lower-level cache line is dirty:
      writing the lower-level cache line to a system memory.
17. The method of clauses 13-16, wherein the opportunistic indicator indicates that the lower-level cache line is opportunistic.
18. The method of clauses 13-17, wherein determining whether the higher-level cache line in the higher-level cache memory has less or equal importance than the lower-level cache line further comprises:
   determining if a first higher-level cache line has less or equal importance than the lower-level cache line;
   determining if a second higher-level cache line has less or equal importance than the lower-level cache line; and
   in response to determining the first higher-level cache line has less or equal importance than the lower-level cache line and the second higher-level cache line has less or equal importance than the lower-level cache line:
      determining if the first higher-level cache line has less or equal importance than the second higher-level cache line; and
      in response to determining that the first higher-level cache line has less or equal importance than the second higher-level cache line:
         replacing the first higher-level cache line in the higher-level cache memory with the lower-level cache line; and associating the opportunistic indicator of the lower-level cache line in the higher-level cache memory.

19. The method of clauses 13-18, wherein determining if the first higher-level cache line has less or equal importance than the second higher-level cache line further comprises:
   determining if the first higher-level cache line is invalid;
   determining if the second higher-level cache line is invalid; and
   in response to determining that the first higher-level cache line is invalid and the second higher-level cache line is not invalid:
      replacing the first higher-level cache line in the higher-level cache memory with the lower-level cache line; and
      associating the opportunistic indicator of the lower-level cache line in the higher-level cache memory.

20. The method of clause 19, wherein, in response to determining that the first higher-level cache line is not invalid and the second higher-level cache line is not invalid, further comprising:
   determining a first priority indicator of the first higher-level cache line and a second priority indicator of the second higher-level cache line; and
   in response to determining that the first priority indicator of the first higher-level cache line is less recently used than the second priority indicator of the second higher-level cache line:
      replacing the first higher-level cache line in the higher-level cache memory with the lower-level cache line; and
      associating the opportunistic indicator of the lower-level cache line in the higher-level cache memory.

21. The method of clause 19, wherein, in response to determining that the first higher-level cache line is not invalid and the second higher-level cache line is not invalid, comprising:
   determining a LRU indicator tracking an order of a plurality of least recently used cache lines, including the first higher-level cache line and the second higher-level cache line; and
   in response to determining that the LRU indicator indicates the first higher-level cache line is less recently used than the second higher-level cache line:
      replacing the first higher-level cache line in the higher-level cache memory with the lower-level cache line; and
      associating the opportunistic indicator of the lower-level cache line in the higher-level cache memory.

22. A processor-based system for allocating a cache line to a higher-level cache memory in response to an eviction request of a lower-level cache line in a lower-level cache memory, comprising:
   means for determining whether the lower-level cache line is opportunistic;
   means for setting an opportunistic indicator to indicate whether the lower-level cache line is opportunistic;
   means for communicating the lower-level cache line and the opportunistic indicator indicating that the lower-level cache line is opportunistic to the higher-level cache memory;
   means for determining, based on the opportunistic indicator of the lower-level cache line, whether a higher-level cache line of a plurality of higher-level cache lines in the higher-level cache memory has less or equal importance than the lower-level cache line; and
   in response to the determining the higher-level cache line has less or equal importance than the lower-level cache line:
      means for replacing the higher-level cache line in the higher-level cache memory with the lower-level cache line; and
      means for associating the opportunistic indicator of the lower-level cache line in the higher-level cache memory.

What is claimed is:

1. A method for allocating a cache line to a higher-level cache memory in response to an eviction request of a lower-level cache line in a lower-level cache memory, comprising:
   determining whether the lower-level cache line is opportunistic;
   determining, based on whether the lower-level cache line is opportunistic, whether a higher-level cache line of a plurality of higher-level cache lines in the higher-level cache memory has less or equal importance than the lower-level cache line; and
   in response to the determining the higher-level cache line has less or equal importance than the lower-level cache line:
      replacing the higher-level cache line in the higher-level cache memory with the lower-level cache line; and
      associating whether the lower-level cache line is opportunistic with the higher-level cache line in the higher-level cache memory.

2. The method of claim 1, wherein determining whether the higher-level cache line of the plurality of higher-level cache lines in the higher-level cache memory has less or equal importance than the lower-level cache line comprises:
   determining whether the higher-level cache line in the higher-level cache memory is invalid; and
   in response to determining the higher-level cache line in the higher-level cache memory is invalid:
      replacing the higher-level cache line in the higher-level cache memory with the lower-level cache line; and
      associating whether the lower-level cache line is opportunistic with the higher-level cache line in the higher-level cache memory.

3. The method of claim 1, further comprising, in response to determining whether the higher-level cache line in the higher-level cache memory is not invalid:
   determining whether the higher-level cache line in the higher-level cache memory is opportunistic; and
   in response to determining the higher-level cache line is opportunistic:
      replacing the higher-level cache line in the higher-level cache memory with the lower-level cache line; and
      associating whether the lower-level cache line is opportunistic with the higher-level cache line in the higher-level cache memory.

4. The method of claim 3, comprising, in response to determining whether the higher-level cache line in the higher-level cache memory is not opportunistic:
   determining whether the lower-level cache line is dirty; and
   in response to determining the lower-level cache line is dirty:
      writing the lower-level cache line to a system memory.

5. The method of claim 1, wherein determining whether the higher-level cache line in the higher-level cache memory has less or equal importance than the lower-level cache line further comprises:
- determining if a first higher-level cache line has less or equal importance than the lower-level cache line;
- determining if a second higher-level cache line has less or equal importance than the lower-level cache line; and
- in response to determining the first higher-level cache line has less or equal importance than the lower-level cache line and the second higher-level cache line has less or equal importance than the lower-level cache line:
  - determining if the first higher-level cache line has less or equal importance than the second higher-level cache line; and
  - in response to determining that the first higher-level cache line has less or equal importance than the second higher-level cache line:
    - replacing the first higher-level cache line in the higher-level cache memory with the lower-level cache line; and
    - associating whether the lower-level cache line is opportunistic with the first higher-level cache line in the higher-level cache memory.

6. The method of claim 5, wherein determining if the first higher-level cache line has less or equal importance than the second higher-level cache line further comprises:
- determining if the first higher-level cache line is invalid;
- determining if the second higher-level cache line is invalid; and
- in response to determining that the first higher-level cache line is invalid and the second higher-level cache line is not invalid:
  - replacing the first higher-level cache line in the higher-level cache memory with the lower-level cache line; and
  - associating whether the lower-level cache line is opportunistic with the first higher-level cache line in the higher-level cache memory.

7. The method of claim 6, further comprising, in response to determining that the first higher-level cache line is not invalid and the second higher-level cache line is not invalid:
- determining a first priority indicator of the first higher-level cache line and a second priority indicator of the second higher-level cache line; and
- in response to determining that the first priority indicator of the first higher-level cache line is less recently used than the second priority indicator of the second higher-level cache line:
  - replacing the first higher-level cache line in the higher-level cache memory with the lower-level cache line; and
  - associating whether the lower-level cache line is opportunistic with the first higher-level cache line in the higher-level cache memory.

8. The method of claim 6, comprising, in response to determining that the first higher-level cache line is not invalid and the second higher-level cache line is not invalid:
- determining a least recently used (LRU) indicator tracking an order of a plurality of least recently used cache lines, including the first higher-level cache line and the second higher-level cache line; and
- in response to determining that the LRU indicator indicates the first higher-level cache line is less recently used than the second higher-level cache line:
  - replacing the first higher-level cache line in the higher-level cache memory with the lower-level cache line; and
  - associating whether the lower-level cache line is opportunistic with the first higher-level cache line in the higher-level cache memory.

9. A processor-based system for allocating a cache line to a higher-level cache memory in response to an eviction request of a lower-level cache line in a lower-level cache memory, comprising:
- means for determining whether the lower-level cache line is opportunistic;
- means for determining, based on whether the lower-level cache line is opportunistic, whether a higher-level cache line of a plurality of higher-level cache lines in the higher-level cache memory has less or equal importance than the lower-level cache line; and
- in response to the determining the higher-level cache line has less or equal importance than the lower-level cache line:
  - means for replacing the higher-level cache line in the higher-level cache memory with the lower-level cache line; and
  - means for associating whether the lower-level cache line is opportunistic with the higher-level cache line in the higher-level cache memory.

10. A processor-based system for allocating a cache line to a higher-level cache memory, comprising:
- a lower-level cache memory configured to store data;
- the processor-based system configured to, in response to an eviction request of a lower-level cache line in the lower-level cache memory:
  - determine whether the lower-level cache line is opportunistic;
  - determine, based on whether the lower-level cache line is opportunistic, whether a higher-level cache line of a plurality of higher-level cache lines in the higher-level cache memory has less or equal importance than the lower-level cache line; and
  - in response to determining the higher-level cache line has less or equal importance than the lower-level cache line:
    - replace the higher-level cache line in the higher-level cache memory with the lower-level cache line; and
    - associate whether the lower-level cache line is opportunistic with the higher-level cache line.

11. The processor-based system of claim 10, configured to determine whether the higher-level cache line of the plurality of higher-level cache lines in the higher-level cache memory has less or equal importance than the lower-level cache line by being configured to:
- determine whether the higher-level cache line in the higher-level cache memory is invalid; and
- in response to determining the higher-level cache line in the higher-level cache memory is invalid:
  - replace the higher-level cache line in the higher-level cache memory with the lower-level cache line; and
  - associate whether the lower-level cache line is opportunistic with the higher-level cache line in the higher-level cache memory.

12. The processor-based system of claim 11, further configured, in response to determining the higher-level cache line in the higher-level cache memory is not invalid, to:
- determine whether the higher-level cache line in the higher-level cache memory is opportunistic; and in response to the determining the higher-level cache line is opportunistic:
  replace the higher-level cache line in the higher-level cache memory with the lower-level cache line; and
  associate whether the lower-level cache line is opportunistic with the higher-level cache line in the higher-level cache memory.

13. The processor-based system of claim 12, further configured, in response to determining the higher-level cache line in the higher-level cache memory is not opportunistic, to:
  determine whether the lower-level cache line is dirty; and
  in response to determining that the lower-level cache line is dirty:
    write the lower-level cache line to a system memory.

14. The processor-based system of claim 10, wherein the lower-level cache line is opportunistic.

15. The processor-based system of claim 10, configured to determine whether the higher-level cache line in the higher-level cache memory has less or equal importance than the lower-level cache line by being configured to:
  determine if a first higher-level cache line has less or equal importance than the lower-level cache line;
  determine if a second higher-level cache line has less or equal importance than the lower-level cache line; and
  in response to determining the first higher-level cache line has less or equal importance than the lower-level cache line and the second higher-level cache line has less or equal importance than the lower-level cache line:
    determine if the first higher-level cache line has less or equal importance than the second higher-level cache line; and
    in response to determining that the first higher-level cache line has less or equal importance than the second higher-level cache line:
      replace the first higher-level cache line in the higher-level cache memory with the lower-level cache line; and
      associate whether the lower-level cache line is opportunistic with the first higher-level cache line in the higher-level cache memory.

16. The processor-based system of claim 15, configured to determine if the first higher-level cache line has less or equal importance than the second higher-level cache line by being configured to:
  determine if the first higher-level cache line is invalid;
  determine if the second higher-level cache line is not invalid; and
  in response to determining that the first higher-level cache line is invalid and the second higher-level cache line is not invalid:
    replace the first higher-level cache line in the higher-level cache memory with the lower-level cache line; and
    associate whether the lower-level cache line is opportunistic with the first higher-level cache line in the higher-level cache memory.

17. The processor-based system of claim 16, further configured, in response to determining that the first higher-level cache line is not invalid and the second higher-level cache line is not invalid, to:
  determine a first priority indicator of the first higher-level cache line and a second priority indicator of the second higher-level cache line; and
  in response to determining that the first priority indicator of the first higher-level cache line is less recently used than the second priority indicator of the second higher-level cache line:
    replace the first higher-level cache line in the higher-level cache memory with the lower-level cache line; and
    associate whether the lower-level cache line is opportunistic with the first higher-level cache line in the higher-level cache memory.

18. The processor-based system of claim 16, further configured, in response to determining that the first higher-level cache line is not invalid and the second higher-level cache line is not invalid, to:
  determine a least recently used (LRU) indicator tracking an order of a plurality of least recently used cache lines, including the first higher-level cache line and the second higher-level cache line; and
  in response to determining that the LRU indicator indicates the first higher-level cache line is less recently used than the second higher-level cache line:
    replace the first higher-level cache line in the higher-level cache memory with the lower-level cache line; and
    associate whether the lower-level cache line is opportunistic with the first higher-level cache line in the higher-level cache memory.

19. The processor-based system of claim 10 integrated into an integrated circuit (IC).

20. The processor-based system of claim 10 integrated into a device selected from a group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

* * * * *